US006819286B2

(12) United States Patent
Armbruster et al.

(10) Patent No.: US 6,819,286 B2
(45) Date of Patent: Nov. 16, 2004

(54) LOCATION DETERMINATION FOR MOBILE UNITS

(75) Inventors: Peter J. Armbruster, Chandler, AZ (US); Keith A. Olds, Mesa, AZ (US); David T. Gustafson, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/375,993

(22) Filed: Feb. 28, 2003

(65) Prior Publication Data

US 2004/0169603 A1 Sep. 2, 2004

(51) Int. Cl.[7] .............................. G01S 1/24; G01S 3/02
(52) U.S. Cl. ...................... 342/387; 342/464; 455/41.2
(58) Field of Search ................................ 342/387, 363, 342/465, 464, 458, 126; 455/41.2

(56) References Cited

U.S. PATENT DOCUMENTS

| | | | | |
|---|---|---|---|---|
| 5,510,800 | A | * | 4/1996 | McEwan ..................... 342/387 |
| 6,150,921 | A | * | 11/2000 | Werb et al. ................ 340/10.1 |
| 6,300,904 | B1 | * | 10/2001 | Dvorak et al. .............. 342/457 |
| 2002/0180640 | A1 | * | 12/2002 | Gilkes et al. ............... 342/387 |
| 2003/0006935 | A1 | * | 1/2003 | Bay ........................... 342/465 |
| 2003/0013146 | A1 | * | 1/2003 | Werb ............................ 435/9 |

FOREIGN PATENT DOCUMENTS

WO      WO 01/58098 A2 *    8/2001     ........... H04L/12/56

OTHER PUBLICATIONS

Pahlava, Kaveh et al, "Indoor Geolocation Science and Technology" IEEE Communications Magazine, Feb. 2002, pp. 112–118.*

* cited by examiner

Primary Examiner—Gregory C. Issing
(74) Attorney, Agent, or Firm—Frank J. Bogacz

(57) ABSTRACT

A method for location determination using Bluetooth techniques is applicable within buildings, underground or within other structures. A mobile unit (10) seeks the location of a cell from location master (20). Location master (20) and a number of location subsidiaries (21–24) determine ranging information with regard to the mobile unit (10) using Bluetooth techniques. The location master (20) then determines the mobile unit location using least squares estimation or other triangulation methods (50). In an alternate embodiment, ranging information is fine tuned for noise and error measurements between the location master and the location subsidiaries (51, 53) are used.

7 Claims, 4 Drawing Sheets

LOCATION DETERMINATION FOR MOBILE UNITS

BACKGROUND OF THE INVENTION

The present invention pertains to location determination services and more particularly to location determination for mobile units.

Historically, location determination has been performed by complex radio frequency computing equipment. One example of the use of location services is for the location of troops and vehicles within a bounded, simulated battlefield. Munitions or small arms fire would be simulated or introduced into the battlefield setting. The position of the munitions is known. The position of various soldiers and vehicles within the battlefield is determined and the effects of the munitions upon the soldiers and vehicles is determined. One such system is shown in U.S. Pat. No. 4,976,619, issued to the same assignee as the present application.

More modern location determination equipment typically employs the global positioning system (GPS). Range measurements are taken from a number of geosynchronous satellites and processed in order to determine the location of a mobile unit and accompanying user virtually anywhere on earth. Global positioning system locations are typically very accurate. Differential GPS location may be performed to obtain even greater accuracy. Global positioning service location receivers typically do not work well if at all within large buildings or underground. Any area which includes substantial electromagnetic shielding will attenuate the GPS signals to make them unusable by a receiver. Also, from time to time the GPs system may be unavailable.

Accordingly, what is needed is a method for determining location of a mobile unit inside buildings, shopping malls or underground, etc.

DESCRIPTION OF THE PREFERRED EMBODIMENT OF THE INVENTION

Bluetooth technology based systems are used for short range broadband communications in such places a homes, malls, parks, campuses, public buildings, office buildings, etc. The present invention describes a Bluetooth based system for providing location determination services for mobile units in the places mentioned above.

The techniques used in the Bluetooth implementation of the present invention include concepts of a "PICO-net" and a "scatter-net". A PICO-net is a network including one master Bluetooth unit and a number of slave or subsidiary Bluetooth units. A scatter-net is a set of overlapping PICO-nets.

Figure 1:
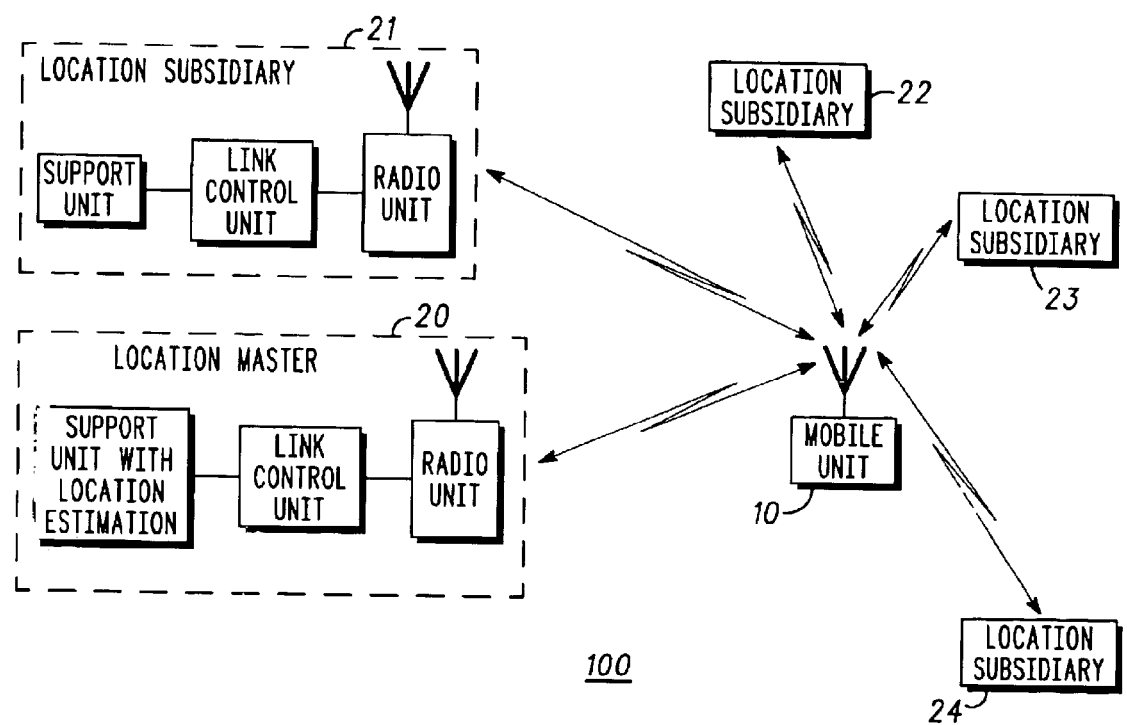
FIG. 1 is a block diagram of a location determination system in accordance with the present invention.

FIG. 1 depicts a block diagram of such a network for location determination via Bluetooth. The system 100 includes a roaming unit 10 which is seeking a location determination of its position. The system also includes a location master 20 and location subsidiaries 21–24. Each location unit whether master or subsidiary includes a radio unit antenna, a link control unit and a support unit. The location master includes a support unit with the location estimation feature described below. The locations of the location master and location subsidiary units are known to the location master unit 20. Further, the location units are arranged in a geometric pattern that assures large angular displacements between the location of the location units and the location of any point within the enclosure where the roaming unit 10 might position itself. The arrangement of location units and the number of location units required for a particular Bluetooth application depends on size and shape and area of coverage for a given implementation.

The present location determination method depends on standard timing associated with paging signals and paging response defined by Bluetooth standards. When a PICO-net location master 20 sends a page to a receiving unit, the receiving unit always replies within 635 microseconds after it receives the page. The receiving unit could be the mobile unit 10, or any of the subsidiary units 20–24. This timing is used to synchronize timeslots and frequency hopping sequence within the PICO-net. This timing also provides a mechanism on which to base the present location method.

Figure 2:
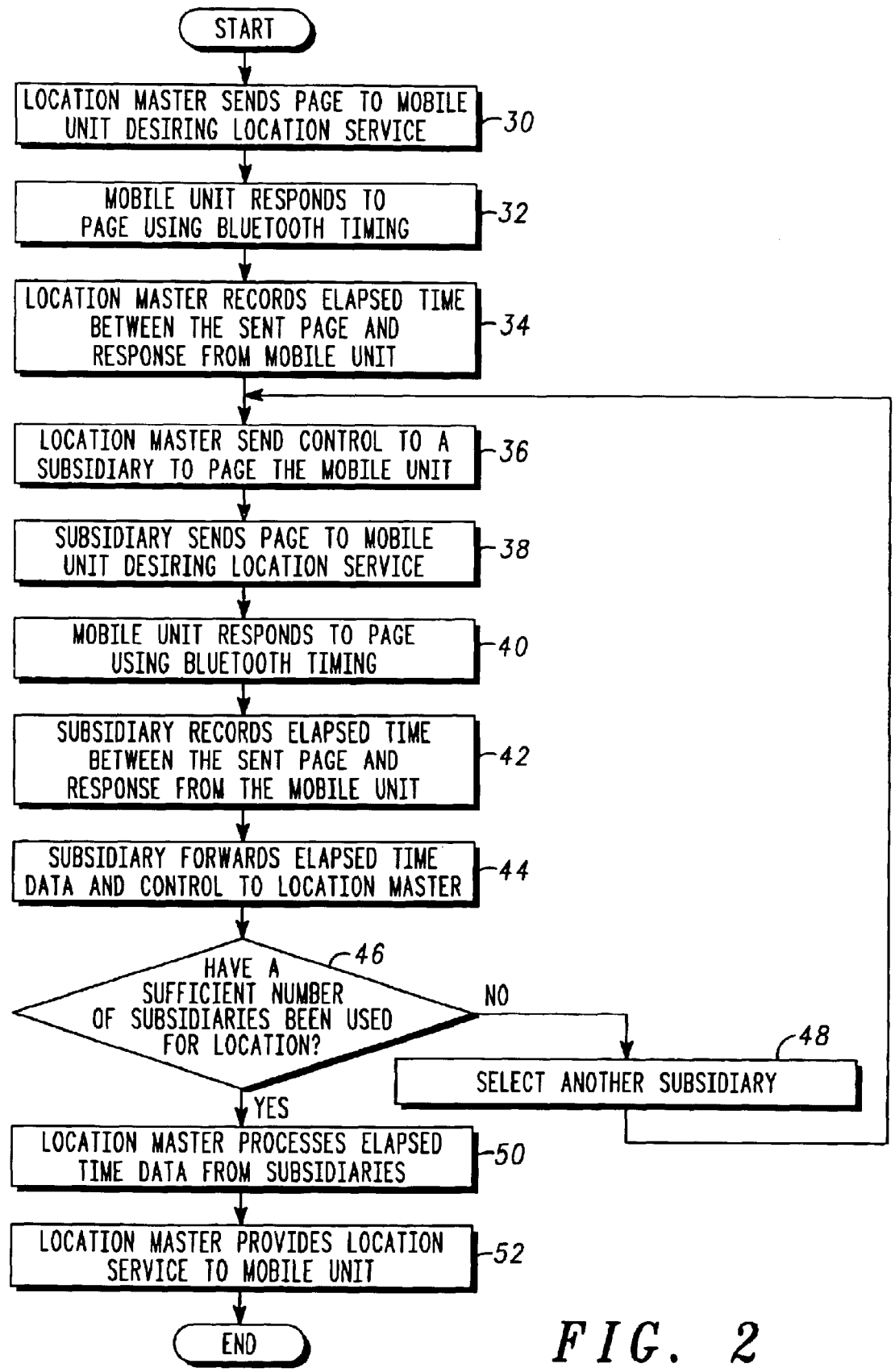
FIG. 2 is a flow chart of a method for location determination via Bluetooth in accordance with the present invention.

Referring to FIG. 2 a flowchart, an embodiment of the present invention is depicted. The location master 20 acts as the master of the pico-net and sends a page to the mobile unit 10 that desires location determination, block 30. Mobile unit 10 then responds to the page of location master 20 using the appropriate Bluetooth timing, block 32. This timing is such that mobile unit 10 must respond within 635 microseconds.

Location master 20 then records the elapsed time between the sent page and the response from the mobile unit, block 34. Next, the location master 20 transfers control and sends an appropriate message to any location subsidiary 21, for example, to become the pico-net master and to page the mobile unit, block 36. Next, the location subsidiary 21 becomes the pico-net master and sends a page to mobile unit 10, block 38. Mobile unit 10 again responds to the page request of location subsidiary now pico-net master 21 using the appropriate Bluetooth timing, block 40.

Location subsidiary, now pico-net master, 21 records the elapsed time between the sent page and the response from mobile unit 10, block 42. Location subsidiary 21 then forwards the elapsed time data and control back to location master 20, block 44.

Next, the location master 20 determines whether a sufficient number of location subsidiaries have been used for the location, block 46. To locate a mobile unit in free space, under most circumstances at least three location pages (one from the location master and two from different location subsidiaries) must be used, however, in some installations, it will possible to provide the location using two location pages (one from the location master and one from the location subsidiary) by taking advantage of the physical environment to avoid the ambiguity generally produced by bilateral triangulation. If the Bluetooth units are mounted such that one of the ambiguous solutions is impossible, e.g. fixed on the exterior wall of a basement mall or subway tunnel, then only one of the two geometric solutions that a simple triangulation method creates would be possible. In that case, two measurements would provide adequate location. The use of four or more provides better accuracy to the location determination. If an insufficient number of location subsidiaries has not been used for the location process, block 46 transfers control to block 48 via the no path. Block 48 selects another location subsidiary, such as location subsidiary 22, etc. Block 48 then transfers control to block 36. The steps of block 36 through 46 are then repeated until a sufficient number of location subsidiaries has been used to multilaterate location for the mobile unit. Again, generally at least three location subsidiaries must be used, that is, the multilateration process must be at least a trilateration process, but under some conditions a bilateration process will be sufficient.

If a sufficient number of location subsidiaries have been used for the location determination process, block 46 transfers control of block 50 via the yes path. Location master 20 then processes the elapsed time data from each of the location subsidiaries 21, 22, etc. The calculation for location of the mobile unit 10 may be accomplished using the following equations as a part of the location process of block 50.

Each paging and response sequence between the location master 20 or a location subsidiary 21–24 and the mobile unit 10 provides two of the following equations.

$$R_i^2 = \Delta x_i^2 + \Delta y_i^2 \quad (1)$$

$$R_i = c\left(\frac{\Delta t_i - 625\mu s - d_{t_i}}{2}\right) \quad (2)$$

$R_i$ is the range between the mobile unit 10 and the $i^{th}$ pico-net master (either the location master or the designated location subsidiary for a particular range measurement) and the $\Delta x_i$ and $\Delta y_i$ are the differences in the coordinates between the location of the mobile unit and the $i^{th}$ pico-net master unit.

$d_{t_i}$ is the timing measurement noise that is assumed to be a zero mean random variable and independent from pico-net to pico-net. This noise is primarily caused by timing errors due to time reference offsets or frequency errors relative to the location master's time and frequency reference in the location subsidiaries or mobile unit.

If location accuracy is not of great concern, the minimum number of measurements (usually three measurements, but possibly two as mentioned above) can be taken. The measurement noise term, $d_{t_i}$ would then be ignored, and trigonometry and analytical geometry would be used to calculate the location of the mobile unit. However, measurement noise and error is always present, so these calculations will be complicated by possible mathematical inconsistencies caused by this noise that the process in block 50 will have to resolve. Again, if accuracy is of no great concern, this resolution could take the form of "splitting the difference" or a simple average of the various solutions for the mobile's x and y location coordinates. A preferred approach that will yield greater accuracy is to take several additional measurements from location subsidiaries. With these additional measurements more versions of equations 1 and 2 are generated, and the solution of this enhanced system of equations is obtained by using one of several well known statistical estimation techniques based on minimizing the mean square error in the estimate. These processes include but are not limited to, simplex, gradient-least squares method, etc. Block 50 will then produce the location of mobile unit 10. Lastly, the location master 20 then transmits the location service information to mobile unit 10, block 52. Those skilled in the art will realize that the process may alternately send the location information to a location server in addition to or instead of to the mobile unit 10, where it can be made available to location based services. The process is then ended. The above method provides for simple and quick determination of location of the mobile unit.

For even greater accuracy of the location determination of mobile unit 10, location master 20 will include different processing and calculation steps as set forth below.

Figure 3:
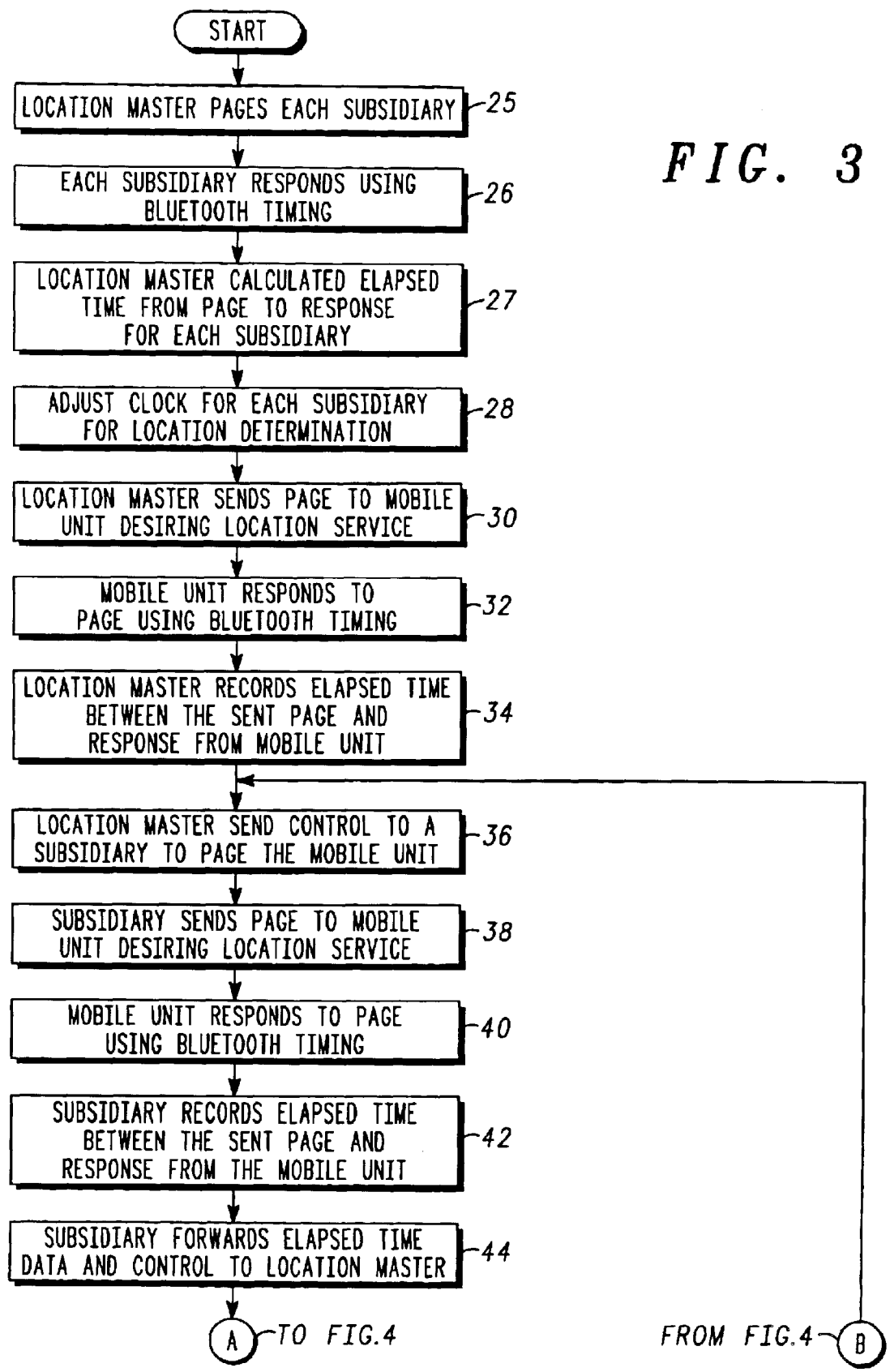
FIGS. 3–4 are a flow chart of an alternate embodiment of a method for location determination using Bluetooth in accordance with the present invention.
Figure 4:
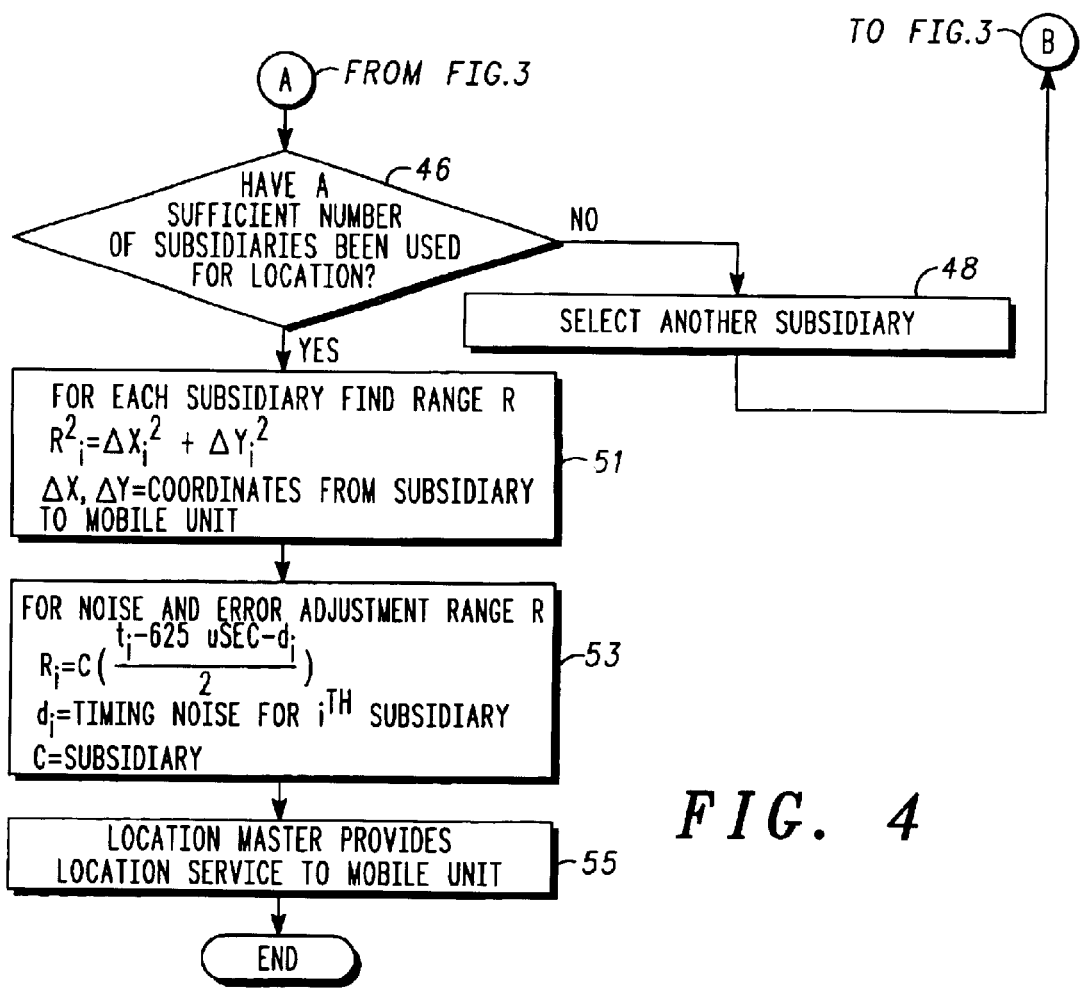

Referring to FIGS. 3 and 4, a flowchart of a higher accuracy location determination method using Bluetooth is shown. The location master 20 initiates the process by paging each of the location subsidiaries 21–24. As previously indicated, each location subsidiary responds to the page within approximately 635 microseconds, block 26. The location master 20 calculates the elapsed time from the page to the response for each location subsidiary 21–24, block 27. Next, the location master 20 records the clock accuracy for each location subsidiary for the location determination process, block 28. The clock accuracy data provides the location master 20 with necessary information for compensating the elapsed time data from each of the location subsidiary units for any time offsets or frequency errors in the location subsidiaries relative to the time and frequency references in the location master. Further, the estimation process is modified using this data, which results in substantial improvement in the accuracy of the estimate. Optionally, the location master 20 could transmit clock synchronization information to the subsidiary units to adjust the subsidiary unit clocks.

Next, similar to the method discussed above, location master 20 sends a page to mobile unit 10, block 30. Mobile unit 10 responds to the page within 635 microseconds according to Bluetooth timing, block 32. The location master 20 records the elapsed time between the sent page and the response from the mobile unit, block 34. Next, location master 20 sends control to a location subsidiary, 21, for example, for location subsidiary 21 to page the mobile unit, block 36. Location subsidiary 21 sends a page to mobile unit 10, block 38. Next, mobile unit 10 responds to the page to location subsidiary 21 using the Bluetooth timing as mentioned above, block 40.

Location subsidiary 21 records the elapsed time between the page and the response from the mobile unit 10, block 42. The subsidiary 21 then forwards the elapsed time data and passes control back to location master 20, block 44.

Location master 20 then determines whether a sufficient number of location subsidiaries 21–24 have been used for the location data, block 46. If an insufficient number of location subsidiaries have been used, block 46 transfers control to block 48 via the no path. Block 48 selects another location subsidiary, such as location subsidiary 22 for example, block 48. Block 48 then transfers control to block 36. The steps of blocks 36 through 46 are repeated for location subsidiary 22.

When a sufficient number of location subsidiaries have been used for the location process, block 46 transfers control to block 51 via the yes path. Again it is to be noted that normally at least the location master and two location subsidiary unit are required for trilateration location of mobile unit 10, although if the physical installation restricts the possible locations adequately, the location master and one location subsidiary may be used for bilateration location of the mobile unit 10. More location subsidiaries may be used which aids in the accuracy of the location determination.

Block 51 determines the location estimation by solving a system of equations for the local coordinates of the mobile unit 10. Each paging and response sequence between the location master 20 or a location subsidiary 21–24 and the mobile unit 10 provides solution to the following two equations.

$$R_i^2 = \Delta x_i^2 + \Delta y_i^2 \quad (1)$$

$$R_i = c\left(\frac{\Delta t_i - 625\mu s - d_{t_i}}{2}\right) \quad (2)$$

$R_i$ is the range between the mobile unit 10 and the $i^{th}$ pico-net master (either the location master or the designated location subsidiary for a particular range measurement) and the $\Delta x_i$ and $\Delta y_i$ are the differences in the coordinates between the location of the mobile unit and the $i^{th}$ pico-net master unit.

$d_i$ is the timing measurement noise that is assumed to be a zero mean random variable and independent from pico-net to pico-net. In this case, since the location master has measured and compensated for the timing errors in the location subsidiaries, the measurement noise is assumed to be caused exclusively by time offsets and frequency errors in the mobile unit 10. Measurement noise and error is always present, so several additional measurements from location subsidiaries are preferred. With these additional measurements the solution is obtained by using one of several well known statistical estimation techniques based on minimizing the mean square error in the estimate. These processes include but are not limited to, simplex, gradient-least squares method, etc. Since in this embodiment there is no significant contribution to this measurement noise from the location subsidiaries, a higher accuracy solution for the location of the mobile can be obtained with approximately the same number of measurements, or approximately the same accuracy can be obtained with a lower number of measurements.

The above methods provide for the use of Bluetooth technology for location determination, velocity and acceleration in areas where other methods such as GPS or cellular triangulation are not available or insufficient, such as in buildings or other structures or underground or in applications the additional cost of a GPS receiver is not deemed appropriate. The use of small, low cost Bluetooth based permanent or semi-permanent location masters and location subsidiaries permits a mobile unit to determine its location in buildings or areas where GPS or cellular triangulation methods are not available or cannot penetrate the electromagnetic shielding.

Although the preferred embodiment of the invention has been illustrated, and that form described in detail, it will be readily apparent to those skilled in the art that various modifications may be made therein without departing from the spirit of the present invention or from the scope of the appended claims.

What is claimed is:

1. A location determination method for a mobile unit using Bluetooth, the location determination method performed by a location master and a plurality of location subsidiaries, the location determination method comprising the steps of:
    measuring a first elapsed time, by the location master, between sent and received messages to the mobile unit;
    measuring at least one of second elapsed times, by the plurality of location subsidiaries, between sent and received messages to the mobile unit;
    processing by the location master the first and second elapsed times to determine a location of the mobile unit;
    providing by the location master the location to the mobile unit, said location relative to the location master;
    sending by the location master a paging message to the mobile unit;
    responding by the mobile unit to the location master using Bluetooth timing;
    the step of measuring a first elapsed time further includes a step of recording the first elapsed time between a paging message sent by the location master and the responding by the mobile unit;
    transferring control by the location master to one of the plurality of location subsidiaries;
    sending a paging message by the one of the plurality of location subsidiaries to the mobile unit;
    responding by the mobile unit to the one of the plurality of location subsidiaries using Bluetooth timing;
    recording by the one of the plurality of location subsidiaries one of the at least one of second elapsed times between the paging message and the responding by the mobile unit;
    forwarding by the one of the location subsidiaries the one of the at least one of second elapsed times to the location master;
    determining whether a threshold number of the plurality of location subsidiaries have been used for the location determination method; and
    if less than the threshold number of location subsidiaries have been used then there is further included the steps of:
    selecting another location subsidiary of the plurality of location subsidiaries; and
    iterating the steps of: transferring control, sending a paging message; responding by the mobile unit; recording; forwarding and determining whether the threshold number has been used.

2. The location determination method as claimed in claim 1, wherein if greater than or equal to the threshold number of the plurality of location subsidiaries have been used, there is further included the steps step of processing the first elapsed time and the plurality of second elapsed times by at least one of: a trigonometric, analytical geometry or least squares error estimation method to produce a location of the mobile unit.

3. A location determination method for a mobile unit using Bluetooth, the location determination method performed by a location master and a plurality of location subsidiaries, the location determination method comprising the steps of:
    measuring by the location master a clock timing between the location master and each of the plurality of location subsidiaries;
    measuring a first elapsed time by the location master between sent and received messages to the mobile unit;
    measuring a at least one of second elapsed times by the plurality of location subsidiaries, between sent and received messages to the mobile unit;
    processing by the location master the first and second elapsed times to determine a location of the mobile unit;
    providing by the location master the location to the mobile unit, said location relative to the location master;
    paging each subsidiary of the plurality of location subsidiaries by the location master;
    responding by each location subsidiary of the plurality of location subsidiaries using Bluetooth timing;
    determining elapsed time between the steps of paging and responding for each of the plurality of location subsidiaries;

the step of measuring a first elapsed time includes the steps of:

sending a paging message by the location master to the mobile unit;

responding by the mobile unit to the paging message using Bluetooth timing;

recording by the location master the first elapsed time;

the step of measuring a plurality of second elapsed times includes the steps of:

transferring control by the location master to one location subsidiary of the plurality of location subsidiaries;

sending a paging message by the one location subsidiary to the mobile unit;

responding to the paging message by the mobile unit using Bluetooth timing;

recording by the one location subsidiary one of the at least one of second elapsed times;

transmitting one of the at least one of second elapsed times to the location master;

determining whether a threshold number of the plurality of location subsidiaries has been used for measuring the plurality of second elapsed times;

if the threshold number of the plurality of location subsidiaries has not been used, there is further included the steps of:

selecting another location subsidiary; and iterating the steps of: transferring; sending a paging message; responding to the paging message; recording at least one of the second elapsed times; transmitting; determining whether the threshold number; if the threshold number has not been used, then selecting another location subsidiary.

4. The location determination method as claimed in claim 3, wherein there is further included the step of adjusting clock timings for each of the plurality of location subsidiaries relative to the location master.

5. The location determination method as claimed in claim 3, wherein the step of processing by the location master includes the step of for each location subsidiary, finding a range R where:

$$R_i^2 = \Delta x_i^2 + \Delta y_i^2 \quad (1)$$

$\Delta x$, $\Delta y$ equal coordinates from location subsidiary to the mobile unit.

6. The location determination method as claimed in claim 5 wherein the step of processing by location master further includes the steps of:

adjusting the range R for noise and error according to $$R_i = c\left(\frac{\Delta t_i - 625\mu s - d_{t_i}}{2}\right) \quad (2)$$

where c equals an identity of the one of the plurality of location subsidiaries;

$R_i$ is the range between the mobile unit 10 and the $i^{th}$ pico-net master for either the location master or the designated location subsidiary for a particular range measurement; and $d_{t_i}$ is the timing measurement noise that is assumed to be a zero mean random variable and independent from pico-net to pico-net;

adjusting the location with the adjusted range to provide a new location; and transmitting the new location to the mobile unit.

7. The location determination method as claimed in claim 3 wherein there is further included a step of fixing a location of the location master.

* * * * *

UNITED STATES PATENT AND TRADEMARK OFFICE
CERTIFICATE OF CORRECTION

PATENT NO. : 6,819,286 B2
DATED : November 16, 2004
INVENTOR(S) : Peter J. Armbruster It is certified that error appears in the above-identified patent and that said Letters Patent is hereby corrected as shown below:

Column 6,
Line 36, delete "steps".

Signed and Sealed this

Twenty-seventh Day of December, 2005

JON W. DUDAS
*Director of the United States Patent and Trademark Office*